United States Patent
Schmidt et al.

(10) Patent No.: US 8,177,884 B2
(45) Date of Patent: May 15, 2012

(54) FUEL DEOXYGENATOR WITH POROUS SUPPORT PLATE

(75) Inventors: Wayde R. Schmidt, Pomfret Center, CT (US); Haralambos Cordatos, Colchester, CT (US); Slade R. Culp, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 344 days.

(21) Appl. No.: 12/469,656

(22) Filed: May 20, 2009

(65) Prior Publication Data

US 2010/0294128 A1    Nov. 25, 2010

(51) Int. Cl.
*B01D 53/22* (2006.01)

(52) U.S. Cl. .......... 95/46; 95/54; 96/4; 96/6; 96/11; 96/12

(58) Field of Classification Search ........ 95/46, 54; 96/4, 6, 7, 11, 12, 13, 14; 55/523, 524; 210/640, 210/641
See application file for complete search history.

(56) References Cited

U.S. PATENT DOCUMENTS

| | | | |
|---|---|---|---|
| 468,682 A | 2/1892 | McLaughlin | |
| 5,094,749 A | 3/1992 | Seita et al. | |
| 5,160,713 A * | 11/1992 | Mazanec et al. | 95/54 |
| 5,411,580 A * | 5/1995 | Tsuchida et al. | 95/54 |
| 5,840,414 A | 11/1998 | Bett et al. | |
| 5,942,347 A | 8/1999 | Koncar et al. | |
| 5,945,084 A * | 8/1999 | Droege | 423/447.4 |
| 6,015,633 A | 1/2000 | Carlstrom, Jr. et al. | |
| 6,024,848 A | 2/2000 | Dufner et al. | |
| 6,123,252 A | 9/2000 | Latz et al. | |
| 6,180,275 B1 | 1/2001 | Braun et al. | |
| 6,251,308 B1 | 6/2001 | Butler | |
| 6,258,476 B1 | 7/2001 | Cipollini | |
| 6,261,711 B1 | 7/2001 | Matlock et al. | |
| 6,270,636 B1 | 8/2001 | Byron, Jr. et al. | |
| 6,274,259 B1 | 8/2001 | Grasso et al. | |
| 6,280,870 B1 | 8/2001 | Eisman et al. | |
| 6,291,093 B1 | 9/2001 | Kindler et al. | |
| 6,303,245 B1 | 10/2001 | Nelson | |
| 6,315,815 B1 | 11/2001 | Spadaccini et al. | |
| 6,322,918 B1 | 11/2001 | Kelley et al. | |

(Continued)

FOREIGN PATENT DOCUMENTS

AT    389020    10/1989

(Continued)

OTHER PUBLICATIONS

"The Allotropes of Carbon", retrived from the internet: <URL: http://invsee.asu.edu/nmodules/carbonmod/density.html>. Retrieved Nov. 21, 2011.*

(Continued)

*Primary Examiner* — Jason M Greene
(74) *Attorney, Agent, or Firm* — Carlson, Gaskey & Olds, P.C.

(57) ABSTRACT

A device for use in a fluid system includes a fuel channel for receiving fuel having dissolved gas therein. A gas permeable membrane supported by a porous support, the gas permeable membrane in communication with the fuel channel. A gas-removal channel adjacent the gas permeable membrane for receiving the dissolved gas from the fuel through the gas permeable membrane and the porous support.

12 Claims, 7 Drawing Sheets

U.S. PATENT DOCUMENTS

| | | |
|---|---|---|
| 6,365,069 B2 | 4/2002 | Butler et al. |
| 6,379,827 B1 | 4/2002 | Cipollini |
| 6,395,416 B1 | 5/2002 | Tanemoto et al. |
| 6,399,231 B1 | 6/2002 | Donahue et al. |
| 6,416,892 B1 | 7/2002 | Breault |
| 6,436,315 B2 | 8/2002 | Butler |
| 6,475,652 B2 | 11/2002 | Grasso et al. |
| 6,524,454 B2 | 2/2003 | Byron, Jr. et al. |
| 6,566,004 B1 | 5/2003 | Fly et al. |
| 6,572,997 B1 | 6/2003 | Iqbal et al. |
| 6,605,381 B1 | 8/2003 | Rosenmayer |
| 6,617,068 B2 | 9/2003 | Dufner et al. |
| 6,630,265 B1 | 10/2003 | Taft, III et al. |
| 6,632,357 B1 | 10/2003 | Barger et al. |
| 6,638,654 B2 | 10/2003 | Jankowski et al. |
| 6,641,948 B1 | 11/2003 | Ohlsen et al. |
| 6,645,650 B2 | 11/2003 | Meyer et al. |
| 6,663,994 B1 | 12/2003 | Fly et al. |
| 6,682,843 B2 | 1/2004 | Speranza et al. |
| 6,686,084 B2 | 2/2004 | Issacci et al. |
| 6,709,492 B1 | 3/2004 | Spadaccini et al. |
| 6,723,462 B2 | 4/2004 | Fan et al. |
| 6,730,426 B2 | 5/2004 | Wangerow |
| 6,733,841 B2 | 5/2004 | Frisk et al. |
| 6,733,915 B2 | 5/2004 | Barton et al. |
| 6,743,536 B2 | 6/2004 | Fuglevand |
| 6,746,982 B2 | 6/2004 | Hertel et al. |
| 6,752,937 B2 | 6/2004 | Butler |
| 6,770,394 B2 | 8/2004 | Applyby et al. |
| 6,780,533 B2 | 8/2004 | Yi et al. |
| 6,780,536 B2 | 8/2004 | Debe et al. |
| 6,783,885 B2 | 8/2004 | Shiepe et al. |
| 6,790,554 B2 | 9/2004 | May et al. |
| 6,828,048 B2 | 12/2004 | Margiott et al. |
| 6,828,054 B2 | 12/2004 | Appleby et al. |
| 6,835,479 B2 | 12/2004 | Balliet et al. |
| 6,838,199 B2 | 1/2005 | Balliet et al. |
| 6,838,202 B2 | 1/2005 | Brady et al. |
| 6,858,337 B2 | 2/2005 | Reiser |
| 6,872,287 B1 | 3/2005 | McLean |
| 6,881,512 B2 | 4/2005 | Siato et al. |
| 6,884,535 B2 | 4/2005 | Saito et al. |
| 6,953,605 B2 | 10/2005 | Sion et al. |
| 6,960,404 B2 | 11/2005 | Goebel |
| 6,962,959 B2 | 11/2005 | Kurano et al. |
| 6,972,161 B2 | 12/2005 | Beatty et al. |
| 6,979,509 B2 | 12/2005 | Breault et al. |
| 6,984,464 B2 | 1/2006 | Margiott et al. |
| 6,994,932 B2 | 2/2006 | Kinkelaar et al. |
| 7,008,584 B2 | 3/2006 | Inoue et al. |
| 7,008,971 B2 | 3/2006 | Taft, III et al. |
| 7,049,018 B2 | 5/2006 | Breault et al. |
| 7,094,490 B2 | 8/2006 | Cao et al. |
| RE39,348 E | 10/2006 | Gorman |
| 7,138,081 B2 | 11/2006 | Inoue et al. |
| 7,147,945 B2 | 12/2006 | Balliet et al. |
| 7,153,343 B2 | 12/2006 | Burlatsky et al. |
| 7,153,409 B2 | 12/2006 | Shiepe et al. |
| 7,160,424 B2 | 1/2007 | Clark et al. |
| 7,166,382 B2 | 1/2007 | Shiepe et al. |
| 7,179,501 B2 | 2/2007 | Beckmann et al. |
| 7,183,017 B2 | 2/2007 | Taft, III et al. |
| 7,202,001 B2 | 4/2007 | Cao et al. |
| 7,217,472 B2 | 5/2007 | Leonida |
| 7,220,513 B2 | 5/2007 | Rohwer et al. |
| 7,226,680 B2 | 6/2007 | Wexel et al. |
| 7,241,409 B2 | 7/2007 | Calarco et al. |
| 7,258,945 B2 | 8/2007 | Bekkedahl et al. |
| 7,282,293 B2 | 10/2007 | Ren et al. |
| 7,291,410 B2 | 11/2007 | Kinkelaar et al. |
| 7,303,835 B2 | 12/2007 | Mathias et al. |
| 7,306,869 B2 | 12/2007 | Leach et al. |
| 7,318,974 B2 | 1/2008 | Ohara et al. |
| 7,326,480 B2 | 2/2008 | Fuglevand |
| 7,329,305 B2 | 2/2008 | Sloan |
| 7,332,240 B2 | 2/2008 | O'Hara et al. |
| 7,354,679 B2 | 4/2008 | Cao et al. |
| 7,365,121 B2 | 4/2008 | Huang et al. |
| 7,405,019 B2 | 7/2008 | Ohara et al. |
| 7,407,721 B2 | 8/2008 | Ren et al. |
| 7,438,985 B2 | 10/2008 | LaConti et al. |
| 7,465,335 B2 | 12/2008 | Schmidt |
| 2006/0112822 A1* | 6/2006 | Gobina ............................ 96/11 |
| 2006/0278073 A1 | 12/2006 | McHugh |
| 2007/0163433 A1* | 7/2007 | Chen et al. .................... 95/46 |
| 2007/0251388 A1* | 11/2007 | Oyama et al. .................. 96/11 |
| 2010/0251888 A1* | 10/2010 | Fekety et al. .................. 95/54 |

FOREIGN PATENT DOCUMENTS

| | | |
|---|---|---|
| CN | 1550252 | 12/2004 |
| DE | 3306500 | 8/1984 |
| EP | 0791383 | 8/1997 |
| EP | 1568403 | 8/2005 |
| EP | 1579901 | 9/2005 |
| EP | 1688349 | 8/2006 |
| WO | 9835739 | 8/1998 |
| WO | 2005025718 | 3/2005 |

OTHER PUBLICATIONS

U.S. Appl. No. 11/334,587, filed Jan. 18, 2006, Titled "Fuel Deoxygenator With Non-Planar Fuel Channel and Oxygen Permeable Membrane".

U.S. Appl. No. 11/265,845, filed Nov. 3, 2005, Titled "Fuel Deoxygenation System With Multi-Layer Oxygen Permeable Membrane".

* cited by examiner

FUEL DEOXYGENATOR WITH POROUS SUPPORT PLATE

This invention was made with government support under Contract No.: FA8650-07-C-5062 with the Department of Air Force. The government therefore has certain rights in this invention.

BACKGROUND

The present application relates to degasification of liquids, and more particularly, to removal of gas from a liquid through a flow perturbation element within a fluid channel.

Liquid fuel is often utilized in vehicles, such as aircraft, as a coolant for various systems. The presence of dissolved oxygen in hydrocarbon liquid fuels may be objectionable because the oxygen supports oxidation reactions that yield undesirable by-products. Dissolution of air in liquid fuel results in an approximately 70 ppm oxygen concentration at atmospheric pressure and equilibrium saturation conditions. When aerated fuel is heated above 250° F. the dissolved oxygen initiates free radical reactions of the fuel resulting in deposits commonly referred to as "coke" or "coking." Coke may be detrimental to fuel system components and may inhibit combustion. The formation of such deposits may impair the normal functioning of a fuel system, either with respect to an intended heat exchange function or the efficient injection of fuel.

One example Fuel Stabilization Unit (FSU) available for use in aircraft to remove oxygen from the liquid fuel includes a planar fuel channel that receives oxygen-saturated fuel. The fuel channel is lined with an oxygen permeable membrane to remove oxygen from the liquid fuel. An oxygen partial pressure gradient across the oxygen permeable membrane draws the oxygen from the liquid fuel to produce liquid fuel that is partially or almost fully depleted of dissolved oxygen.

SUMMARY OF THE INVENTION

A fuel deoxygenator device for use in a fuel system according to an exemplary aspect of the present application includes a fuel channel for receiving fuel having dissolved gas therein. A gas permeable membrane supported by a porous support, the gas permeable membrane in communication with the fuel channel. A gas-removal channel adjacent to the gas permeable membrane for receiving the dissolved gas from the fuel through the gas permeable membrane and the porous support.

A method of removing a gas from a liquid according to an exemplary aspect of the present application includes generating a gas concentration differential between the fuel channel and a gas permeation channel to draw at least a portion of the gas from the fluid at least partially through a gas permeable membrane supported on a porous support of an open cell porous carbon material and into the gas permeation channel.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION OF THE DISCLOSED EMBODIMENT

Figure 1:
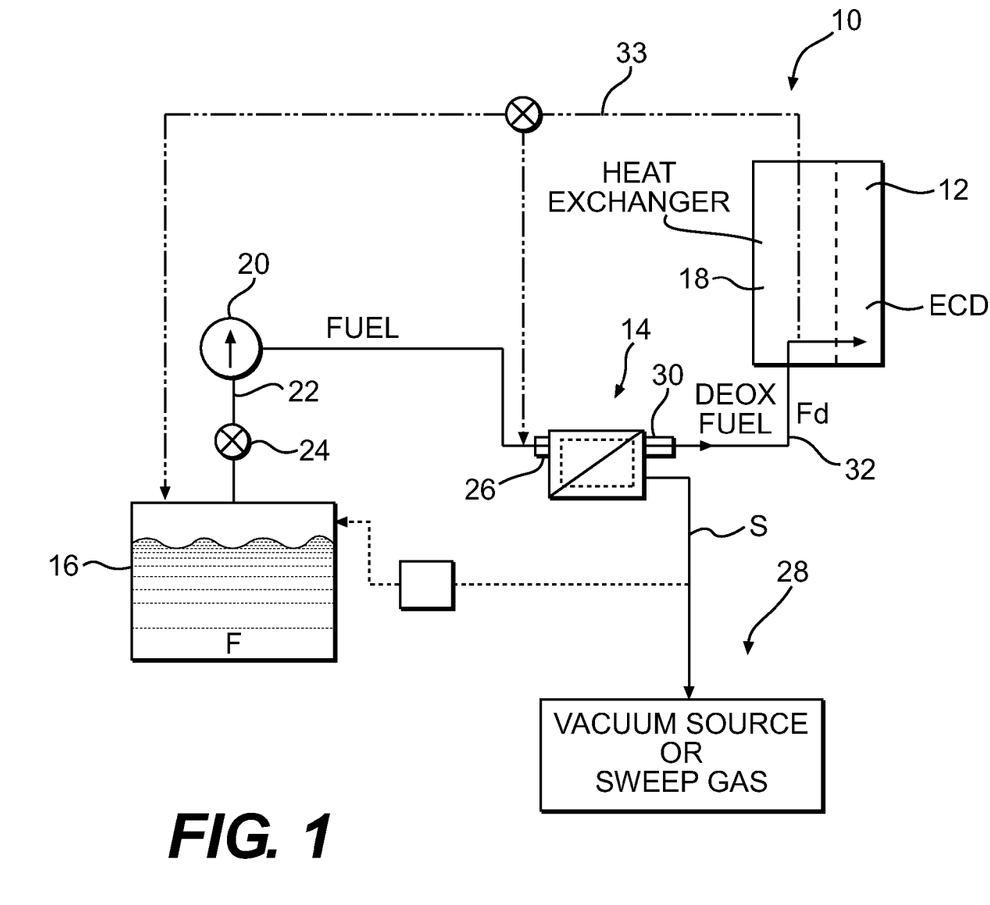
FIG. 1 is a general schematic diagram of an energy conversion device (ECD) and an associated fuel system.

FIG. 1 illustrates a general schematic view of a fuel system 10 for an energy conversion device (ECD) 12 which demonstrates one example use of a fuel deoxygenator system 14 and is not intended to be limiting. The fuel deoxygenator system 14 receives liquid fuel F from a reservoir 16 such as a fuel tank. The fuel F is typically a liquid hydrocarbon such as jet fuel. The ECD 12 may exist in a variety of forms in which the fuel, at some point prior to eventual use for processing, for combustion, or for some form of energy release, acquires sufficient heat to support autoxidation reactions and coking if dissolved oxygen is present to any significant extent in the fuel.

One form of the ECD 12 is a gas turbine engine, such as in aircraft. Typically, the fuel also serves as a coolant for one or more sub-systems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchangers distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the fuel deoxygenator system 14. The pressure applied by the fuel pump 20 assists in the circulation of fuel F through the fuel deoxygenator system 14 and other portions of the fuel system 10. As the fuel F passes through the fuel deoxygenator system 14, oxygen is selectively removed into a vacuum or sweep gas system 28. The sweep gas S can be any gas that is essentially free of oxygen.

The deoxygenated fuel Fd flows from a fuel outlet 30 of the fuel deoxygenation system 14 via a deoxygenated fuel conduit 32, to the heat exchange system 18 and to the ECD 12. A portion of the deoxygenated fuel may be recirculated, as represented by recirculation conduit 33 to either the fuel deoxygenation system 14 and/or the reservoir 16. It should be understood that although a particular component arrangement is disclosed in the illustrated embodiment, other arrangements will also benefit herefrom. Alternatively, only a certain fraction of the flow from the fuel tank may enter the deoxygenator.

Figure 2A:
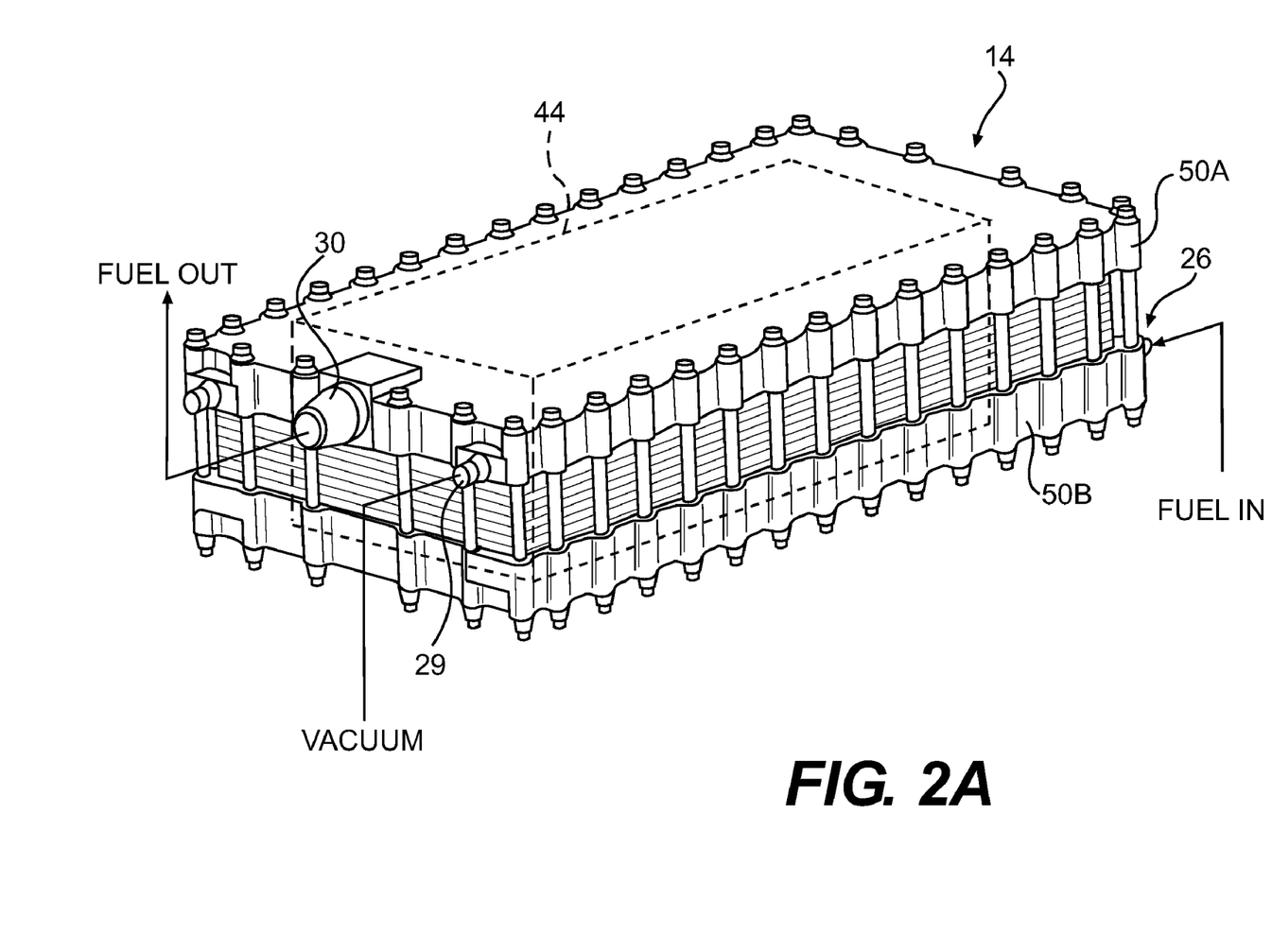
FIG. 2A is an embodiment of a fuel deoxygenator system utilized in the fuel system of FIG. 1.
Figure 2B:
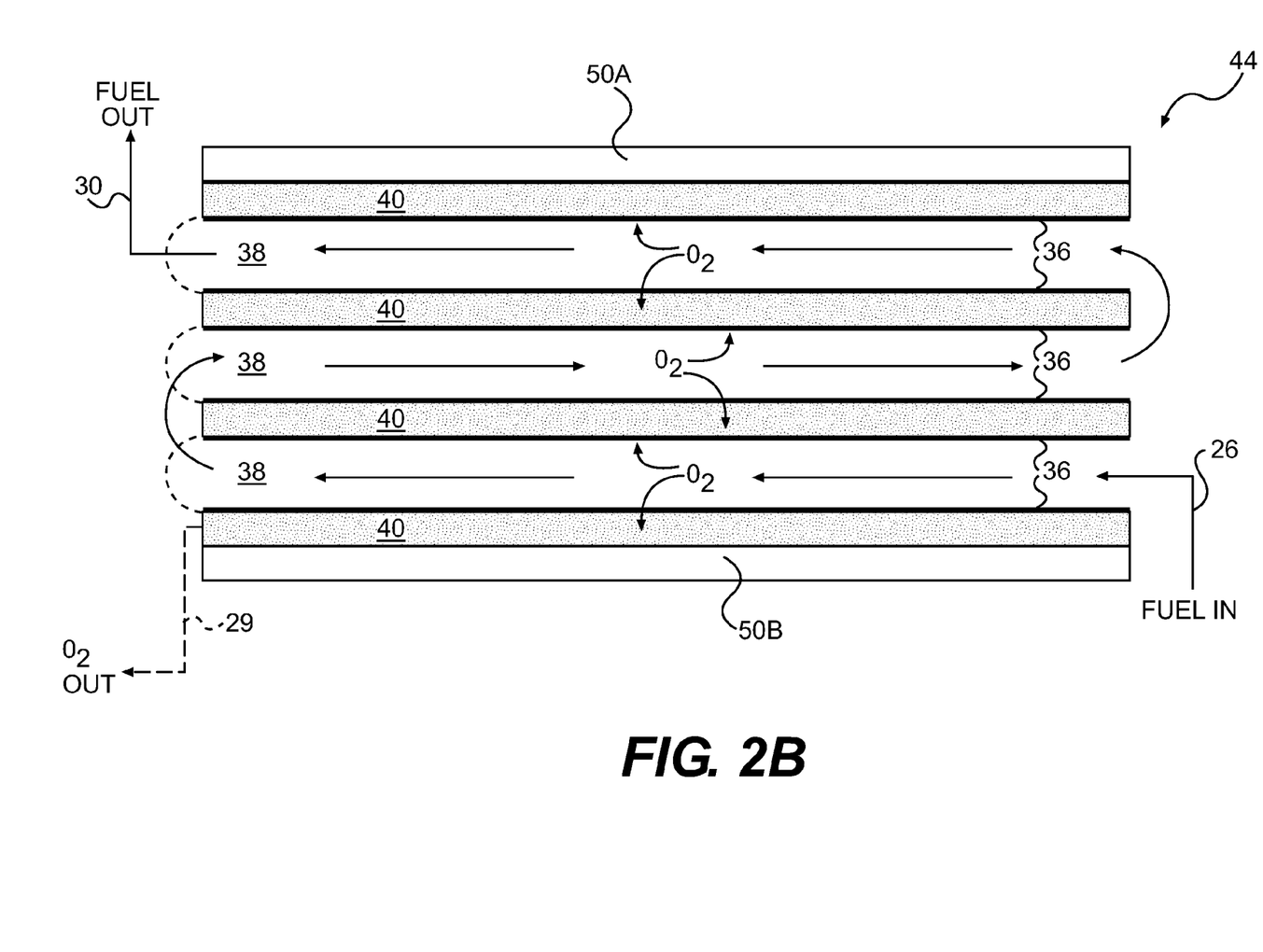
FIG. 2B is a simplified cross-sectional view illustrating the operation of the example fuel deoxygenator system of FIG. 2A.

Referring to FIGS. 2A and 2B, a fuel deoxygenator system 14 is shown schematically to illustrate the basic operation. The fuel deoxygenator system 14 includes a fuel plate assembly 44, one or more fuel channels 38 that include oxygen permeable membranes 36 and gas permeable channels 40. The fuel channels 38 are fluidly connected between the fuel inlet 26 and the fuel outlet 30. It should be understood that the channels 38 may be of various shapes and arrangements different from the simplified arrangement shown.

The oxygen permeable membrane 36 allows dissolved oxygen (and other gases) to diffuse through angstrom-size openings, such as voids or pores, but excludes the larger fuel molecules. Alternatively, or in conjunction with the angstrom-size openings, the oxygen permeable membrane 36 utilizes a solution-diffusion mechanism to dissolve and diffuse oxygen through the membrane, while excluding the fuel.

The family of Teflon AF, which is an amorphous copolymer of perfluoro-2,2-dimethyl-1,3-dioxole (PDD) often identified under the trademark "Teflon AF" registered to E. I. DuPont de Nemours of Wilmington, Del., and the family of Hyflon AD, which is a copolymer of 2,2,4-trifluoro-5-trifluoromethoxy-1,3-dioxole (TTD) registered to Solvay Solexis, Milan, Italy have proven to provide effective results as oxygen permeable membranes for fuel deoxygenation. The Teflon AF 2400 and/or Teflon AF 1600 material is believed to use a solution-diffusion mechanism. Given this description, one of ordinary skill in the art will recognize other types of fluoropolymers or other polymer materials to meet their particular needs as an oxygen permeable membrane.

The inlet 26 of the fuel deoxygenator system 14 receives oxygen-rich fuel and the fuel outlet 30 discharges oxygen-depleted fuel. A vacuum port 29 is in communication with the fuel channel 38 for creating an oxygen partial pressure gradient within the fuel channel 38 through the membrane to extract dissolved oxygen and other dissolved gases.

The specific quantity of fuel channels 38 is determined by application-specific requirements, such as fuel type, fuel temperature, and mass flow demand from the energy conversion device. Further, different fuels containing different amounts of dissolved oxygen may require different amounts of deoxygenation to remove a desired amount of dissolved oxygen.

Figure 2C:
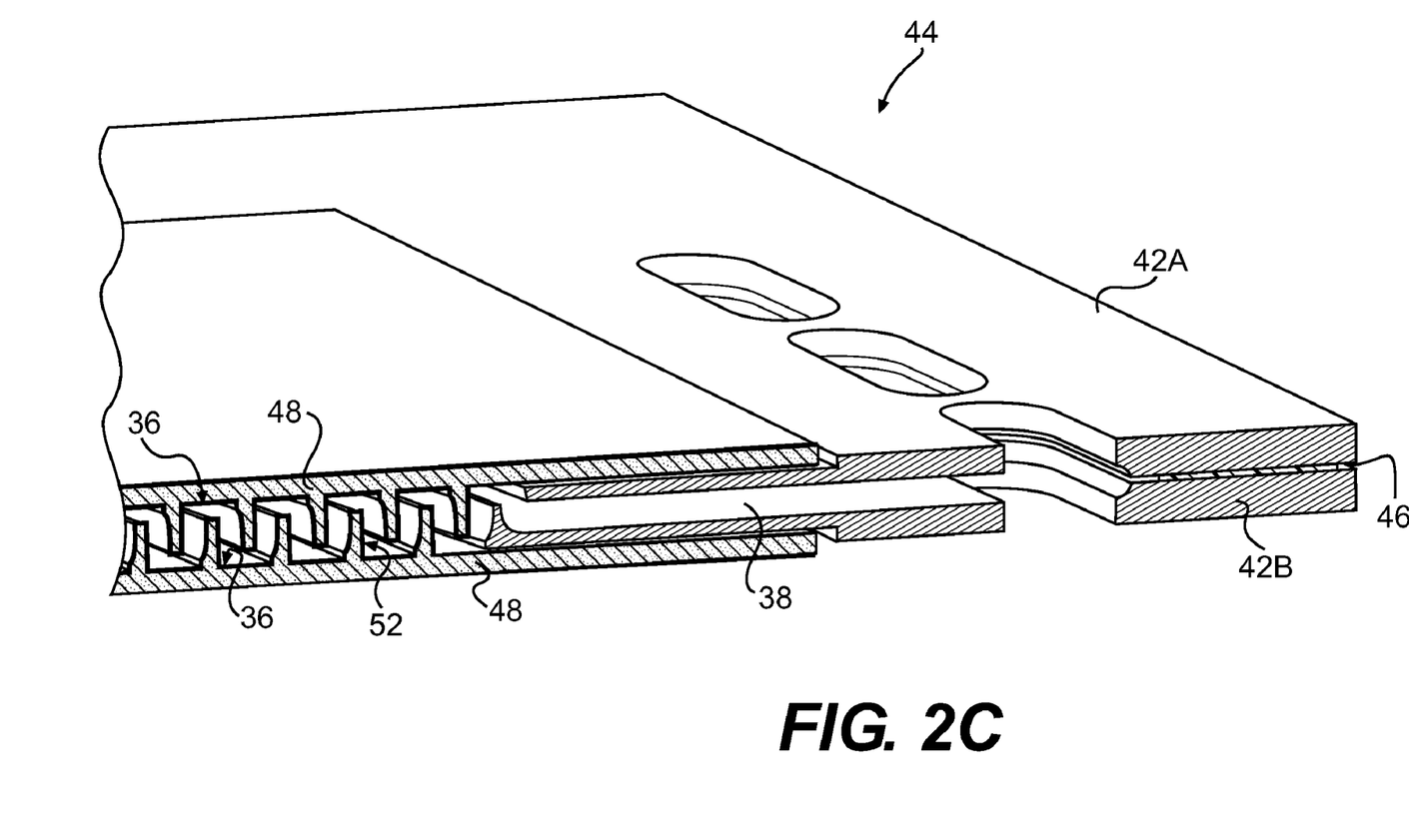
FIG. 2C is a perspective view of an embodiment of a fuel channel.

Referring to FIG. 2C, each fuel channel 38 may be assembled from a fuel plate assembly 44 which defines each fuel channel 38 between the inlet 26 and outlet 30 (FIG. 2B). The configuration of the fuel channel 38 is defined to maximize fuel exposure to the oxygen permeable membrane 36 to maximize the amount of dissolved oxygen removed from the fuel. The fuel channels 38 are formed to maximize the amount of oxygen that comes in contact with the oxygen permeable membrane 36 in order to maximize the amount of dissolved oxygen removed from the fuel. The fuel channels 38 are preferably small enough that fuel is in contact with the oxygen permeable membrane 36 but also large enough so as to not restrict fuel flow.

Each fuel channel 38 may include a first frame plate 42A, a second frame plate 42B, and a fuel plate gasket 46 therebetween. The first frame plate 42A and the second frame plate 42B retain a respective porous support 48 which at least partially defines the gas permeable channel 40 (FIG. 2B). It should be understood that the fuel plate assembly 44 disclosed in the illustrative embodiment illustrates only two frame plates and a gasket for the sake of clarity, it should be understood that any number of plate assemblies may be located within the outer housing (FIG. 2A).

It should be understood that the fuel plate assembly 44 disclosed in the illustrative embodiment illustrates only two fuel plates for the sake of clarity, it should be understood that any number of plates may be located between the outer housing plates 50A, 50B (FIG. 2A).

The porous support 48 may define a multitude of flow perturbation elements 52. The flow perturbation elements 52 enhance deoxygenation due to higher surface-to-volume ratio and by perturbing the flow near the oxygen permeable membrane 36 to enhance oxygen transport from the bulk of the fuel directly to the surface of the membrane. The flow perturbation elements 52 of the fuel deoxygenator system 14 therefore enhance contact between oxygen and the oxygen permeable membrane 36 to increase mass transport of dissolved oxygen. Location of the oxygen permeable membrane 36 on the flow perturbation elements 52 also provides greater oxygen removal efficiency. Therefore, the fuel deoxygenator system 14 can be made more compact for the same performance or be made to remove more oxygen with the same size.

Figure 2D:
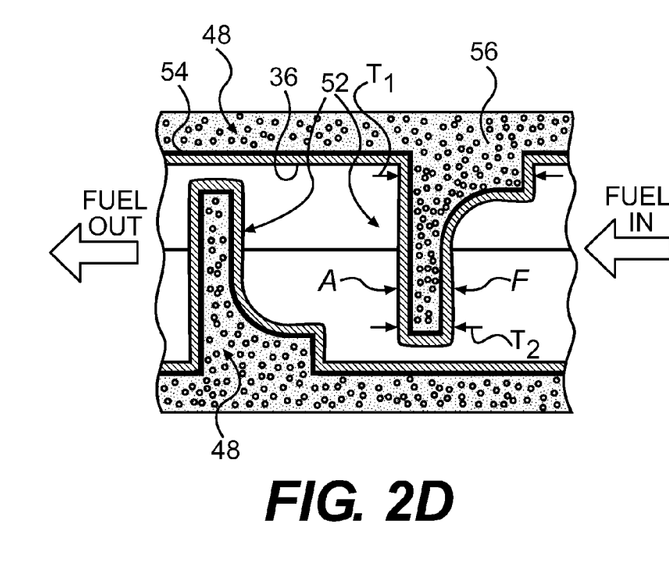
FIG. 2D is a cross-sectional view of the fuel channel.
Figure 2E:
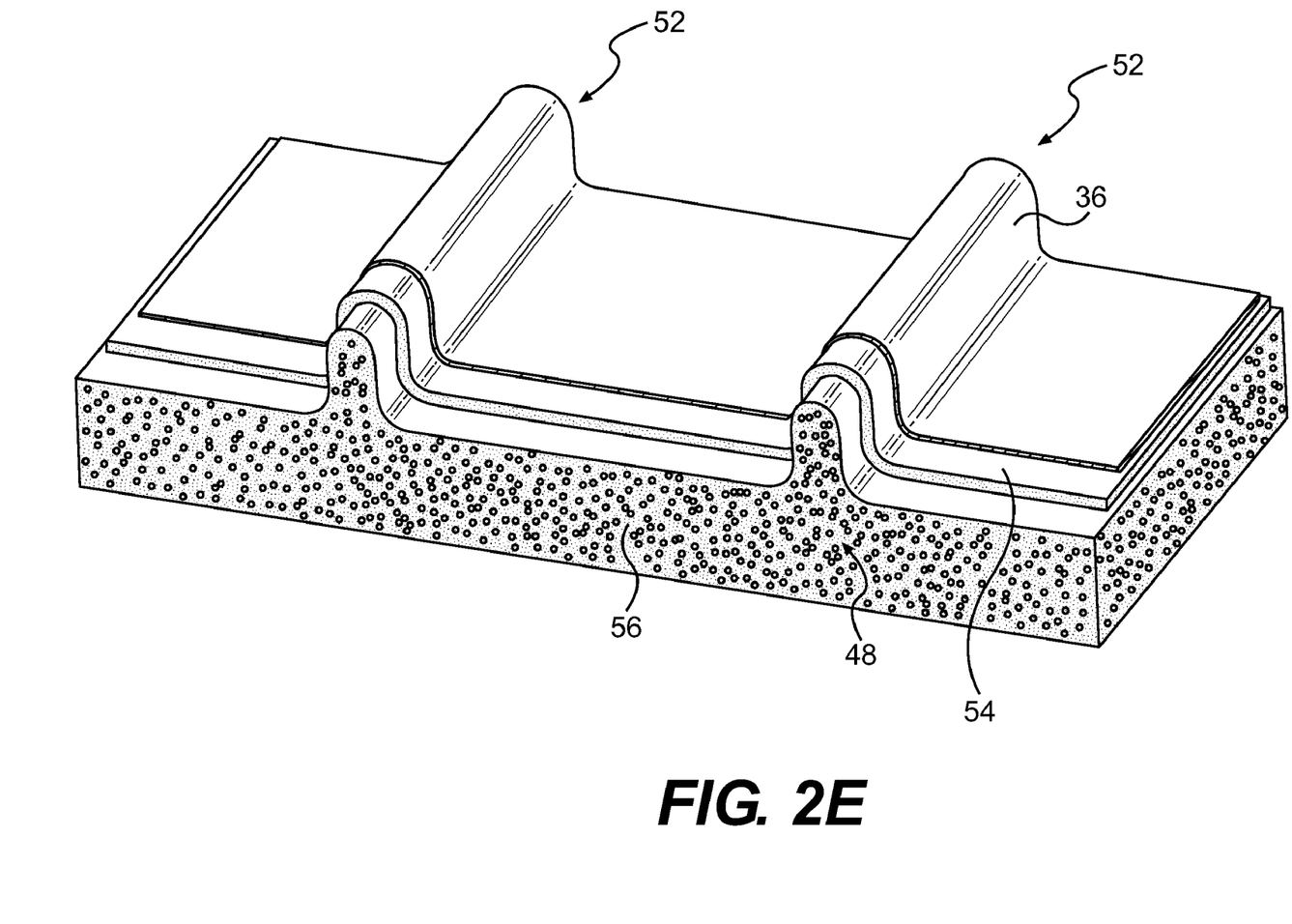
FIG. 2E is a perspective cross-sectional view of a support plate having a backing layer and an oxygen permeable membrane

Referring to FIG. 2D, each flow perturbation element 52 defines a forward surface F and an aft surface A. The forward surface F faces a direction approximately opposite to the fuel flow direction and the aft surface A faces in a direction with the fuel flow direction. It should be understood that each flow perturbation element 52 may be of various configurations such as a stepped thickness arrangement $T_1$; $T_2$ (FIG. 2D) or a generally equivalent thickness (FIG. 2E).

A backing layer 54, such as porous polyetherimide or other porous material, is located between the porous support 48 and the oxygen permeable membrane 36. In one example, the backing layer 54 is about 2 mil thick, however, the thickness can be varied depending on the needs of the particular design.

The backing layer 54 in one example is deposited onto the porous support 48 with a phase inversion technique such as that disclosed by R. W. Baker, "Membrane Technology and Applications", Second Edition, John Wiley & Sons, Ltd., pp. 96-103.

Open pores 56 (shown schematically) of the porous support 48 with the angstrom-size openings of the oxygen permeable membrane 36 and the backing layer 54 define the gas permeable channel 40. The backing layer 54 provides a bridge for oxygen transport between the oxygen permeable membrane 36 and the porous support 48. In other words, the porosity of the backing layer 54 provides passages for oxygen to move from the oxygen permeable membrane 36 into the porous support 48.

The backing layer 54 may provide resistance reduction, as the pore 56 size in the porous support 48 may be relatively too big for the oxygen permeable membrane 36 to be coated directly. If the pore size is fine enough while flow resistance is still at a desired level, the oxygen permeable membrane 36 can be coated directly on the porous support 48. The oxygen permeable membrane 36 prevents fuel passage but allows dissolved oxygen to be transported from the fuel channel 38 into the gas permeable channel 40.

Figure 2F:
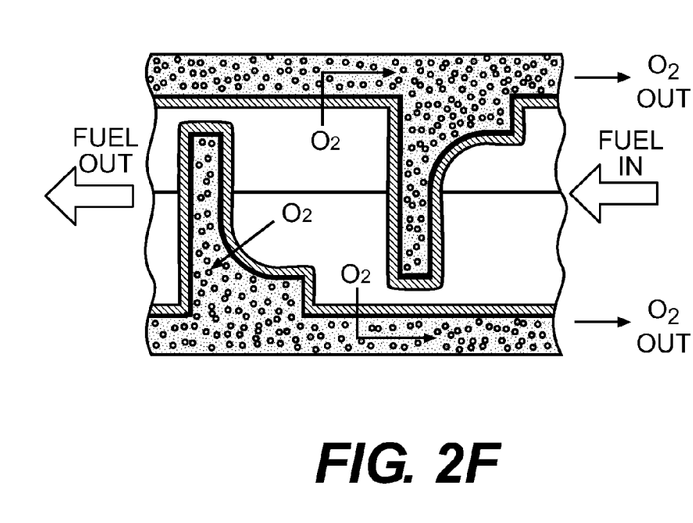
FIG. 2F is a cross-sectional view of the support plate illustrating flow therethrough.

Fuel flowing through the fuel channel 38 is in contact with the oxygen permeable membrane 36. Vacuum via the vacuum port 29 creates an oxygen partial pressure differential (i.e., an oxygen concentration differential) across the oxygen permeable membrane 36 which causes transfer of oxygen dissolved within the fuel through the oxygen permeable membrane 36, porous backing layer 54, and porous support 48 (FIG. 2F). Alternatively, the same oxygen partial pressure differential is created by sweep gas which constantly removes the oxygen in the gas permeable channel 40. The porous support 48 operates as the gas removal channel 40. Alternatively, a separate open space may be provided as the gas removal channel.

The porous support 48 in one non-limiting embodiment, is fabricated of an open cell porous carbon material such as that manufactured by Poco Graphite, Inc. of Decatur, Tex. USA. The porous support 48 is resistant to chemical degradation by liquid fuel and has a relatively high porosity to provide uniform vacuum distribution for efficient oxygen removal without significant oxygen partial pressure build-up. In one non-limiting embodiment, the porous support 48 may be defined by a compressive strength greater than about 300 psi at 180° F. (82° C.), a density less than about 1.6 g/cc, and a uniform surface porosity with a pore diameter less than about 20 μm or various combinations thereof.

There may be various types of porous, light-weight materials that appear at first to be suitable as a support for the non-planar membrane: porous high-Tg plastics and porous metals as disclosed herein. However, experimentation under the specific conditions for this application revealed that porous plastics are in general unsuitable and porous metals may require significantly higher cost and complexity compared to the porous carbon described in this invention.

With regard to porous plastics, the majority of commercially available structures are polyethylene and polypropylene. The materials may be unsuitable for this application due to their low glass-transition temperature (Tg) compared to the 170° F. (77° C.) operating temperature which results in a tendency for plastic deformation (creep) under pressure. Therefore, only porous plastics with Tg much higher than 170° F., such as porous polyetherimide (PEI) and a certain type of porous polyurethane were investigated. These materials are not expected to exhibit significant creep at 170° F. and 300 psi.

Samples of open-cell porous structures with pore sizes in the required range were obtained and their plastic deformation at 300 psi and 170° F. was investigated. Experimentation was necessary because while the material itself may not be subject to creep under these conditions, the behavior of a porous structure made of this material may be subject to some degree of deformation depending on the number and size of the pores. It was found that all plastic samples which had the required porosity to be suitable as substrates for the non-planar membrane resulted in plastic deformation over time at the order of at least 5%, which far exceeds the tolerance requirements for this application.

With regard to porous metals, aluminum and titanium are the two primary practical choices based on relatively low weight and reasonable cost. These porous structures are commonly made by sintering of metal powder. The porosity is controlled by the diameter of the powder, up to a maximum of about 35%. However, the density of porous aluminum and porous titanium having maximum porosity would be about 1.8 and about 2.9 g/cc respectively, which may result in a heavier structure than the desired weight targets. Hence, a thin, porous metal substrate would have to be attached to a separate, light-weight support structure such as the aluminum foam made by Energy Research and Generation Inc. of Oakland, Calif. Experimentation with such "laminates" showed that, while feasible, process control to maintain the required tolerances and reproducibility may render this arrangement prohibitively expensive. In contrast, the porous carbon plates disclosed herein were machined at tolerance specification and their low density combined with flexural rigidity allows for usage in a single, unsupported manner.

Another porous support 48 is a porous carbon body that includes the following components and manufacturing steps. The following three components were dry blended for five minutes: 50% by weight of the mixture being graphite powder, such as grade "A4421" graphite powder available from the Asbury Carbons, Inc., located in Asbury, N.J., U.S.A.; 30% by weight of the mixture being carbon fiber, such as grade "AGM-99" carbon fiber from the aforesaid Asbury Carbons; and, 20% by weight of the mixture being polyvinylidene fluoride as a hydrophobic binder, such as grade K761, available from the Atofina, Inc. located in King of Prussia, Pa, U.S.A. The mixture was then loaded into a mold and simultaneously compression molded at a temperature of about 400 degrees F. (204° C.) and at a pressure of about 400 psi. for about 5 minutes to a bulk density of 1.40 g/cc to form the porous support 48.

Figure 3:
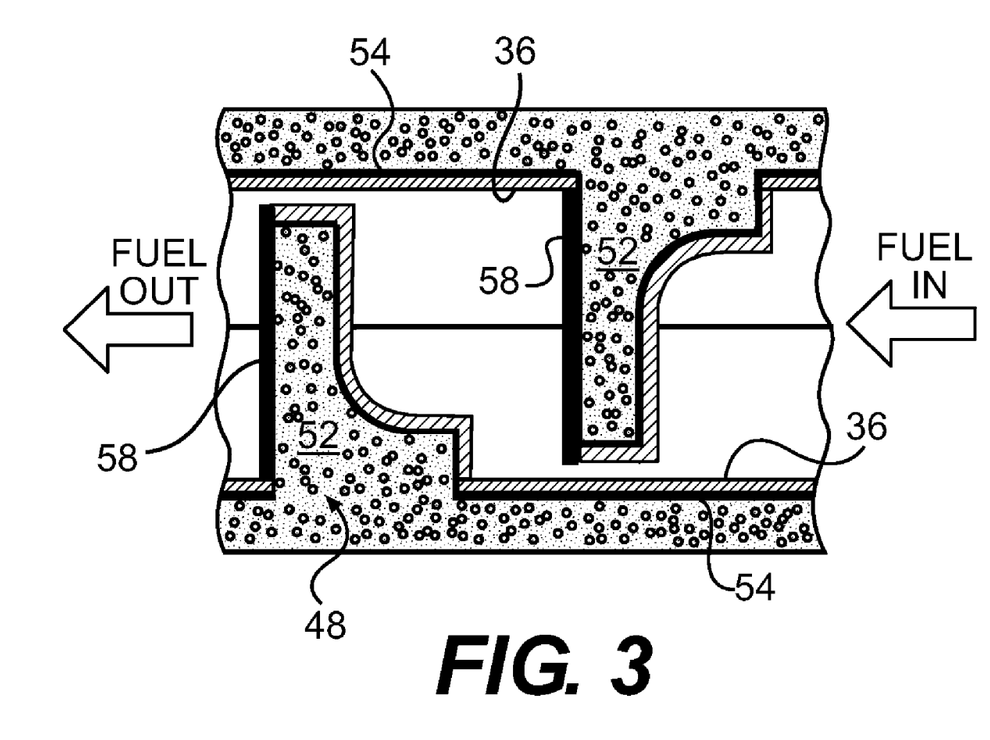
FIG. 3 is an embodiment having the oxygen permeable membrane on a selected section of the flow perturbation element.

Referring to FIG. 3, the oxygen permeable membrane 36 may be selectively coated on only a portion or portions of the flow perturbation elements 52 formed by the porous support 48. This allows oxygen removal through selected surfaces of the flow perturbation element 52, such as surfaces that receive relatively greater incident fuel flow, to increase mass transport of dissolved oxygen. Other surfaces that are less advantageously located for fuel perturbation and mass transport of dissolved oxygen do not include the oxygen permeable membrane 36 but may include a seal surface 58 to prevent fuel from infiltrating the porous support 48.

The oxygen permeable membrane 36 is formed, for example, by spray coating, electro-spray coating (e.g., wherein electrical field is used to direct the spray to desired areas), brush coating, solution cast coating, vapor deposition coating, plasma coating, or solventless vapor coating. In one example of manufacturing, the oxygen permeable membrane 36 is coated in situ over the backing layer 54 and porous support 48. If the pore 56 size of the porous support is fine enough while flow resistance is still at proper level, the oxygen permeable membrane 36 can be coated directly on the porous support 48 without the backing layer 54.

One example of in situ coating includes solventless vapor coating. In solventless vapor coating, a desired amount of precursor materials, such as monomers for the formation of amorphous fluoropolymer, is vaporized. The vaporized monomers are deposited onto the porous support 48 or backing layer 54 to form a green coating. The term "green" refers generally to a coating that is not fully developed. Here the green coating is not yet fully developed because the monomers have not yet been polymerized. The porous support 48 and green coating are then heated at a selected temperature in an inert atmosphere to polymerize the green coating and thereby form the oxygen permeable membrane 36. The selected temperature depends on the selected type of polymer, and is generally known for polytetrafluoroethylene. The disclosed vapor deposition process provides a uniform thin membrane on the non-planar shape of the porous support 48 with or without the backing layer 54. In one example, a solventless vapor coating device provides a uniform thin membrane having a thickness between about 100 nm and 2 μm over the porous support 48.

Alternatively, one example of plasma coating includes introducing precursor materials, such as monomers, into a plasma generator. Plasma generated in the plasma generator bombards the monomers with electrons. Impact between the electrons and monomers fragment, and thereby activate, the monomers. The activated fragments are coated onto the non-planar shape and polymerize to form the oxygen permeable membrane 36. Similar to the vapor deposition process, plasma coating is thought to provide a uniform thin membrane having a thickness between about 100 nm and 2 μm on the non-planar shape.

Alternatively, in one example of solution casting, precursor materials are mixed in solution with a solvent. The desired surfaces of the porous support 48 are dipped into the solution. The solution and porous support 48 are then heated to remove solution solvent and polymerize the precursor materials to form the oxygen permeable membrane 36. Optionally, the backing layer 54 is deposited onto the porous support 48 before the solution casting process to serve as a template for formation of the oxygen permeable membrane 36.

Alternatively, coating of the oxygen permeable membrane 36 is accomplished by chemical vapor deposition (CVD) as described by Sharangpani and Singh (Rev. Sci. Instrum. 68 (3), March 1997).

Alternatively, coating of the oxygen permeable membrane 36 is accomplished by laser ablation as described by Blanchet (Appl. Phys. Lett. 62 (5), 1 Feb. 1993).

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

We claim:

1. A fuel deoxygenator device for use in a fuel system, comprising:
   a fuel channel for receiving fuel having a dissolved gas therein;
   a porous support manufactured of an open cell porous carbon material, said porous support defined by at least one of the following characteristics: a compressive strength greater than about 300 psi at 180° F., a density not to exceed about 1.6 g/cc, a uniform surface porosity having a pore diameter less than about 20μm, and an open porosity greater than about 35%;
   a gas permeable membrane supported by said porous support, said gas permeable membrane in communication with the fuel channel; and
   a gas-removal channel adjacent said gas permeable membrane for receiving the dissolved gas from the fuel through the gas permeable membrane and said porous support.

2. The device as recited in claim 1, wherein said porous support defines a multitude of flow perturbation elements.

3. The device as recited in claim 2, wherein said flow perturbation elements extend at least partially into said fuel channel.

4. The device as recited in claim 1, further comprising a backing layer applied to said porous support.

5. The device as recited in claim 4, wherein said gas permeable membrane is applied at least partially over said backing layer.

6. The device as recited in claim 1, wherein said porous support comprises an open cell porous carbon material which defines a compressive strength greater than about 300 psi at 180° F., a density not to exceed about 1.6 g/cc, a uniform surface porosity having a pore diameter less than about 20 μm and an open porosity greater than about 35%.

7. The device as recited in claim 1, wherein the gas-removal channel comprises a gas partial pressure differential relative to the fuel channel to draw dissolved gas from the fuel through the gas permeable membrane into the gas-removal channel.

8. The system as recited in claim 7, further including a vacuum source in communication with the gas-removal channel.

9. The system as recited in claim 7, further including a sweep gas source in communication with the gas-removal channel.

10. A method of removing a gas from a liquid, comprising:
    communicating a fluid fuel that includes a dissolved gas through a fuel channel; and
    generating a gas concentration differential between the fuel channel and a gas permeation channel to draw at least a portion of the gas from the fluid at least partially through a gas permeable membrane supported on a porous support of an open cell porous carbon material and into the gas permeation channel, said porous support defined by at least one of the following characteristics: a compressive strength greater than about 300 psi at 180° F., a density not to exceed about 1.6 g/cc, a uniform surface porosity having a pore diameter less than about 20 μm, and an open porosity greater than about 35%.

11. The method as recited in claim 10, wherein the dissolved gas includes a dissolved oxygen gas.

12. The method as recited in claim 10, wherein said porous support comprises an open cell porous carbon material which defines a compressive strength greater than about 300 psi at 180° F., a density not to exceed about 1.6 g/cc, a uniform surface porosity having a pore diameter less than about 20 μm and an open porosity greater than about 35%.

* * * * *